UNITED STATES PATENT OFFICE.

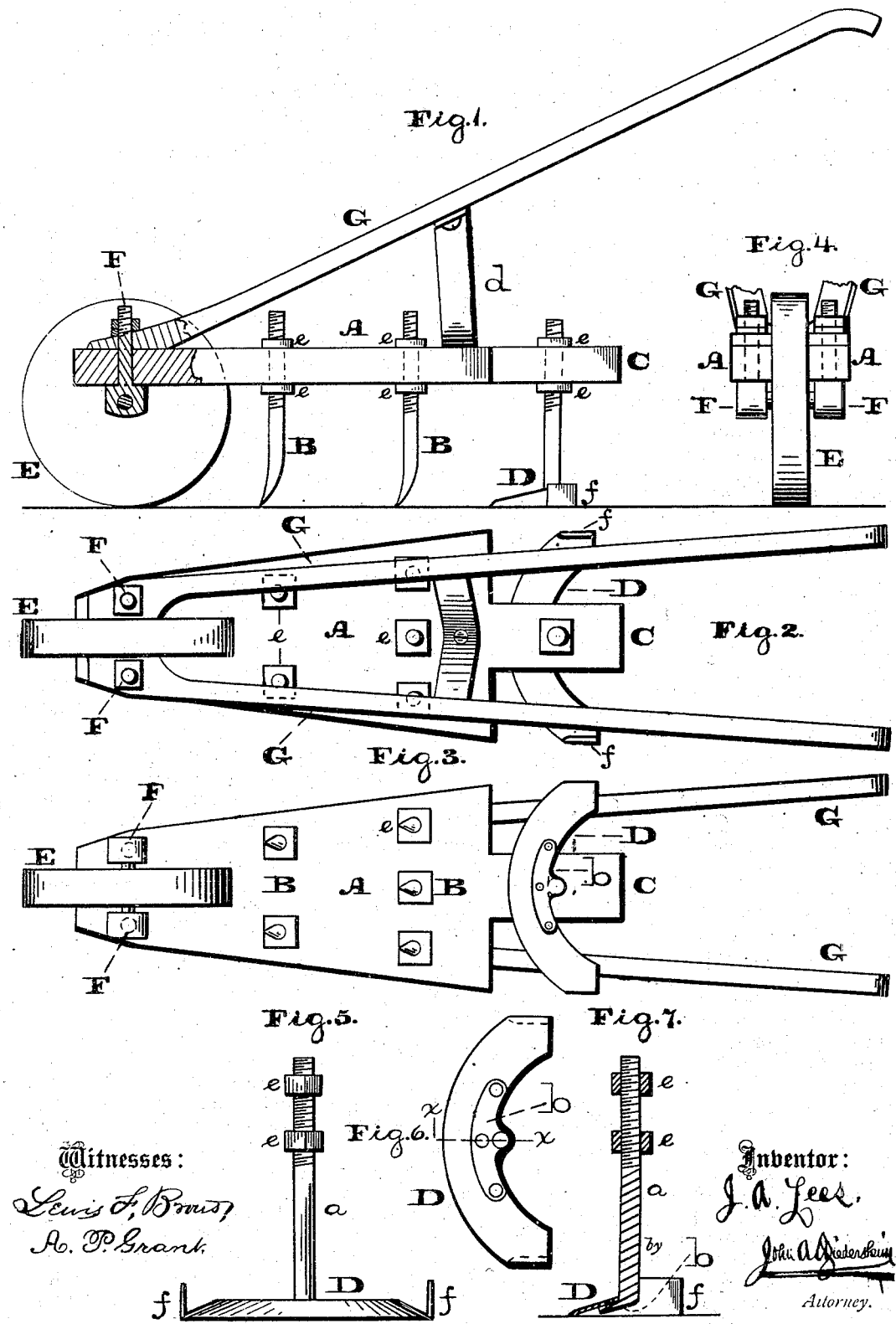

JONATHAN A. LEES, OF PHILADELPHIA, PENNSYLVANIA.

IMPROVEMENT IN WEED-CUTTERS.

Specification forming part of Letters Patent No. 198,129, dated December 11, 1877; application filed June 29, 1877.

*To all whom it may concern:*

Be it known that I, JONATHAN A. LEES, of the city and county of Philadelphia, and State of Pennsylvania, have invented a new and useful Improvement in Weed-Destroyers, which improvement is fully set forth in the following specification and accompanying drawings, in which—

Figure 1 is a side view, partially sectional, of the apparatus embodying my invention. Fig. 2 is a top or plan view thereof. Fig. 3 is a bottom view thereof. Fig. 4 is a front view of a portion thereof. Fig. 5 is a front view of the cutter detached. Fig. 6 is a bottom view thereof. Fig. 7 is a central vertical section thereof in line $x$, Fig. 6.

Similar letters of reference indicate corresponding parts in the several figures.

The invention consists in the peculiar construction of the cutter of a weed-destroyer, as hereinafter specified and claimed.

The invention further consists in a weed-destroyer, the body, beam, or frame of which is provided with teeth or shares of approved construction, and is made with a rear extension-piece of less width than itself, so as to leave spaces on each side between the said beam and its extension, so that the turned-up sides or edges of the cutter-blade may be always in sight of the operator, the increased length of the machine consequent upon this construction of beam being compensated for by the attachment of the handles at the front end thereof, whereby the proper leverage for turning or otherwise manipulating the machine is obtained, and at the same time the rear portion of the machine is left free to the view of the operator.

Referring to the drawings, A represents a beam or frame, which is of triangular form, and has connected to it two rows of teeth, B, the teeth of one row alternating with those of the other row. C represents a beam, which extends centrally rearward from the beam A, and has connected to it the shank $a$ of a cutter or blade, D, the lower portion of the shank terminating in or having secured to it a shoe, $b$, to which the blade D will be directly screwed or riveted, thus providing a strong support and connection for the blade, and permitting its removal when worn, and the application of a fresh blade. E represents the wheel supporting the front portion of the beam A, and its axle is fitted in the eyes of eyebolts F, which pass through the beam A, and through the forward ends of handles G, which are thus connected to the front end of the apparatus, or to the apparatus in line with the axle of the wheel, said handles extending rearward and upward, and being properly supported by standards $d$ secured to the beam.

The shanks of the blade D and teeth B are screw-threaded, and on opposite sides of the beam have nuts $e$ $e$, the nuts on the lower sides acting as shoulders, and regulating the degree of penetration and cut of the teeth and blade, the nuts on the upper sides firmly securing said teeth and blade in adjusted positions.

The blade D is of the form of a section of an annulus—that is to say, it has a curved cutting-edge, which, however, extends horizontally in a right line from side to side, so that every portion of said edge is in the same plane. From the cutting-edge the upper face of the blade extends rearward in an upwardly-curved direction, the curvature being uniform at all points, as more readily seen in Fig. 5, and the sides $ff$ of the blades are turned up, and the front edges thereof are sharp.

When the apparatus is moved forward, the teeth B pulverize the earth, clear the weeds thereof, and remove stones, &c. Then the blade D cuts the weeds, in which operation the earth is not thrown to the side, and as the blade cuts close to the plants they will not be covered by the earth, whereby the blade renders valuable service.

As the operator moves forward he will observe the position of the sides $f$ of the blade, which sides act as guides, and cause the apparatus to be operated straight and uniform, said sides being exposed or observable, owing to the spaces aside of the beam C, which, as has been stated, is a rear extension of the beam A.

The connection of the handles G to the beams is such that the power will be exerted directly on the front of the apparatus, whereby the latter may be run with great ease. Moreover, when it is necessary to lift the teeth or blade, this is easily accomplished, owing to the length of the handles and consequent great leverage thereof.

The beam or frame A and its rear extension C are of one single or solid piece of material, as wood, whereby the construction is simplified in the lessening of parts, and also great strength and durability are obtained.

Having thus described my invention, what I claim as new, and desire to secure by Letters Patent, is—

1. The blade D, having a cutting-edge curved on an arc of a circle, and extending horizontally in a right line from side to side, so that every portion of said edge shall lie in the same plane, and having its upper face extending rearwardly in an upward uniformly-curved direction, in combination with the upturned sides $f f$, and the shank $a$, terminating in a shoe, $b$, to which the blade is removably connected, substantially as described.

2. The beam A, with teeth B, and provided with the rear extension C, leaving spaces at the sides of the latter, in combination with the blade D, connected to the extension C, and having turned-up sides $f$, and, with the handles G, secured to the front end of the beam A, substantially as described.

JONATHAN A. LEES.

Witnesses:
JOHN A. WIEDERSHEIM,
H. E. HINDMARSH.